Aug. 7, 1923.

A. H. FOX 1,464,357

AIR COOLING SYSTEM FOR ENGINES OF MOTOR VEHICLES

Filed June 21, 1921    3 Sheets-Sheet 1

Inventor:
Ansley H. Fox,
by Jas. L. Skidmore
his Att'y.

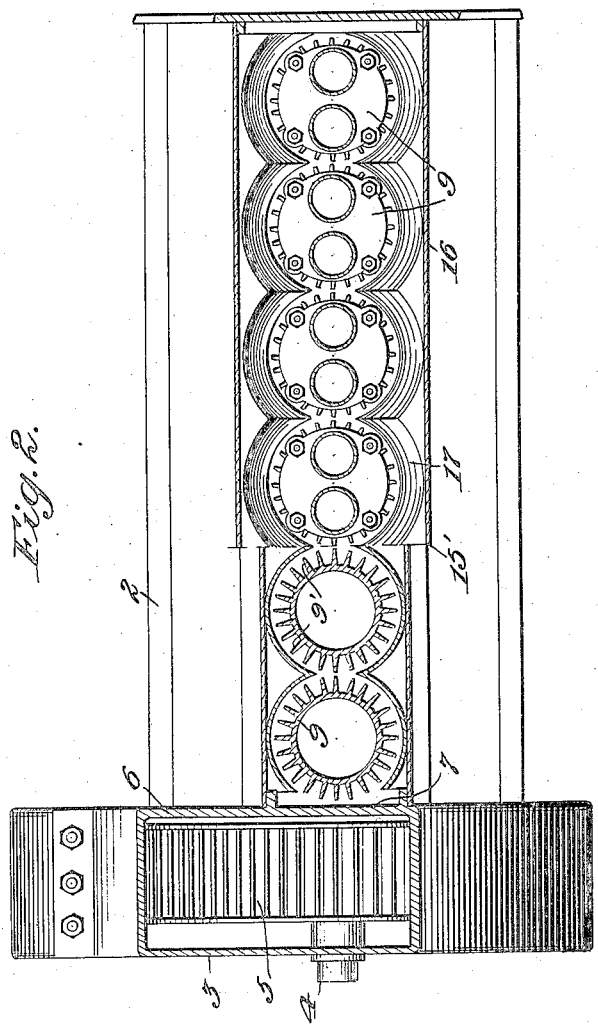

Aug. 7, 1923.
A. H. FOX
1,464,357
AIR COOLING SYSTEM FOR ENGINES OF MOTOR VEHICLES
Filed June 21, 1921  3 Sheets-Sheet 3
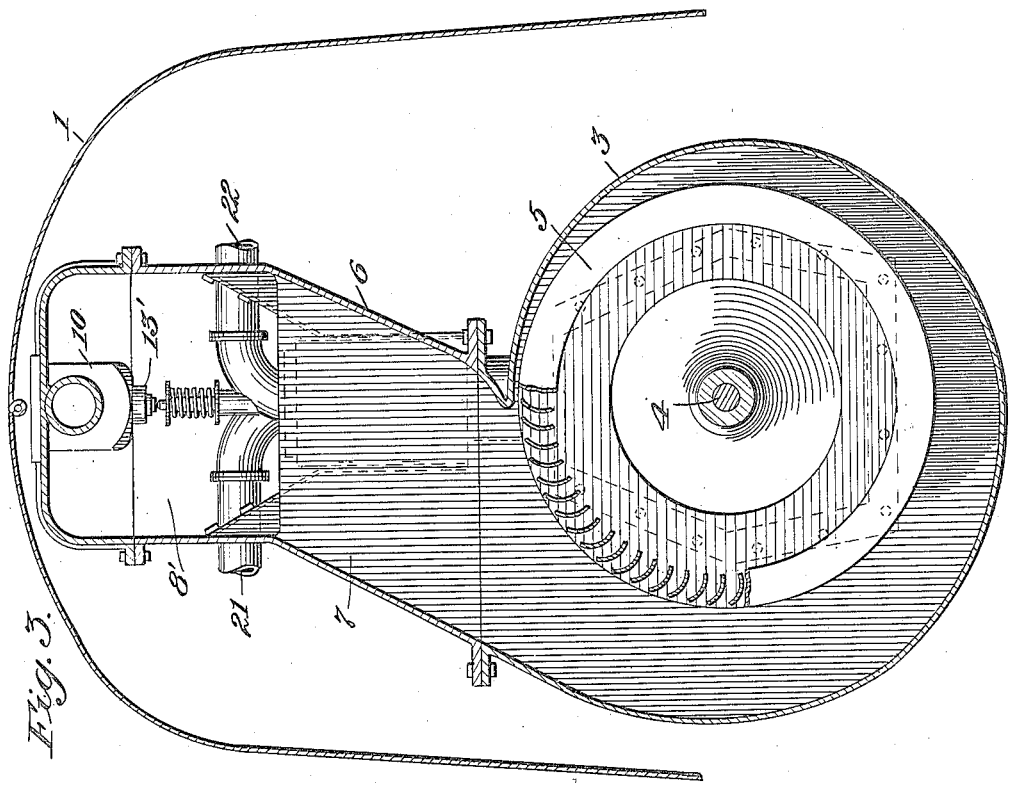
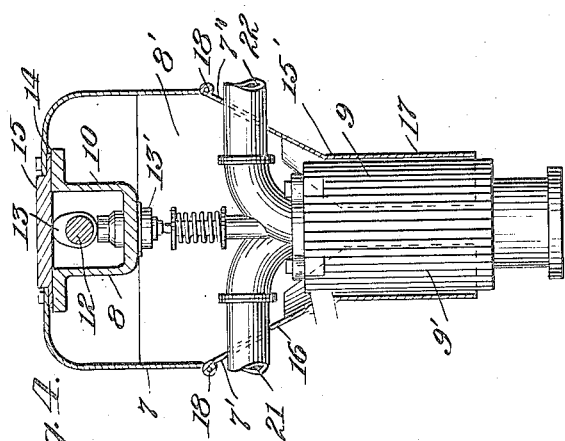
Inventor:
Ansley H. Fox,
by Jas. L. Skidmore
his Atty.

Patented Aug. 7, 1923.

1,464,357

UNITED STATES PATENT OFFICE.

ANSLEY H. FOX, OF PHILADELPHIA, PENNSYLVANIA, ASSIGNOR TO FOX MOTOR CAR COMPANY, OF PHILADELPHIA, PENNSYLVANIA, A CORPORATION OF DELAWARE.

AIR-COOLING SYSTEM FOR ENGINES OF MOTOR VEHICLES.

Application filed June 21, 1921. Serial No. 479,187.

*To all whom it may concern:*

Be it known that I, ANSLEY H. Fox, a citizen of the United States, residing at Philadelphia, in the county of Philadelphia and State of Pennsylvania, have invented certain new and useful Improvements in Air-Cooling Systems for Engines of Motor Vehicles, of which the following is a specification.

This invention relates to new, novel and efficient means for cooling explosive engines, and is especially designed for use as an air cooling system for the internal combustion engines of motor vehicles.

The prime object of the invention is to provide simple, novel, durable and thoroughly efficient means located at the front portion of a motor vehicle for cooling by air a multicylinder engine in which the cylinders are arranged in tandem, and by such means that the air at atmospheric temperature will be forced under pressure into an air sealed chamber and will be distributed in contact with all of the cylinders so as to simultaneously impart the same cooling effect thereto.

Another object of the invention is to provide means located at the front of the vehicle for maintaining the circulation of air under forced pressure around and past each engine cylinder at speed proportionate to the speed of the engine, and the construction is such that I am enabled to take advantage of the motion of the vehicle to increase the volume of the cooling current of air.

A further object of the invention is to so construct my novel air cooling means that a separable sealed air cooling chamber is formed above and around the several cylinders, said chamber being provided with means whereby access may easily and readily be had to the engine valves for the purpose of renewal or repair.

A further object of this invention is to provide novel means for utilizing air to cool motor cylinders as a substitute for the water and other liquid cooling systems, without requiring any radical departure in the exterior design of motor vehicles and without requiring material changes in motor construction heretofore employed.

A further object of the invention is to provide a novel scroll fan casing at the front of the vehicle, whereby an increased volume of air may be forced by the fan into the air sealed chamber and distributed around and past each engine cylinder, thus furnishing simultaneously the same cooling effect to each of the cylinders.

The foregoing and such other objects as may appear from the ensuing description are accomplished by the novel features of construction, arrangement, location and combination of the parts hereinafter more fully described, illustrated in the accompanying drawings and particularly pointed out in the claims appended hereto, it being understood that slight changes in the precise form, proportions, and minor details of the construction may be resorted to without departing from the spirit or sacrificing any of the advantages of the invention.

In the accompanying drawings which form a part of the specification it will be seen that:

Figure 2 is a longitudinal sectional plan taken on the plane of the dotted lines II—II, Figure 1.

Figure 3 is a sectional elevation taken on the plane of the dotted lines III—III, Figure 1, and Figure 4 is a sectional elevation taken on the plane of the dotted lines IV—IV, Figure 1.

Similar numerals of reference are employed to designate corresponding parts throughout the several figures of the drawings.

Figure 1:
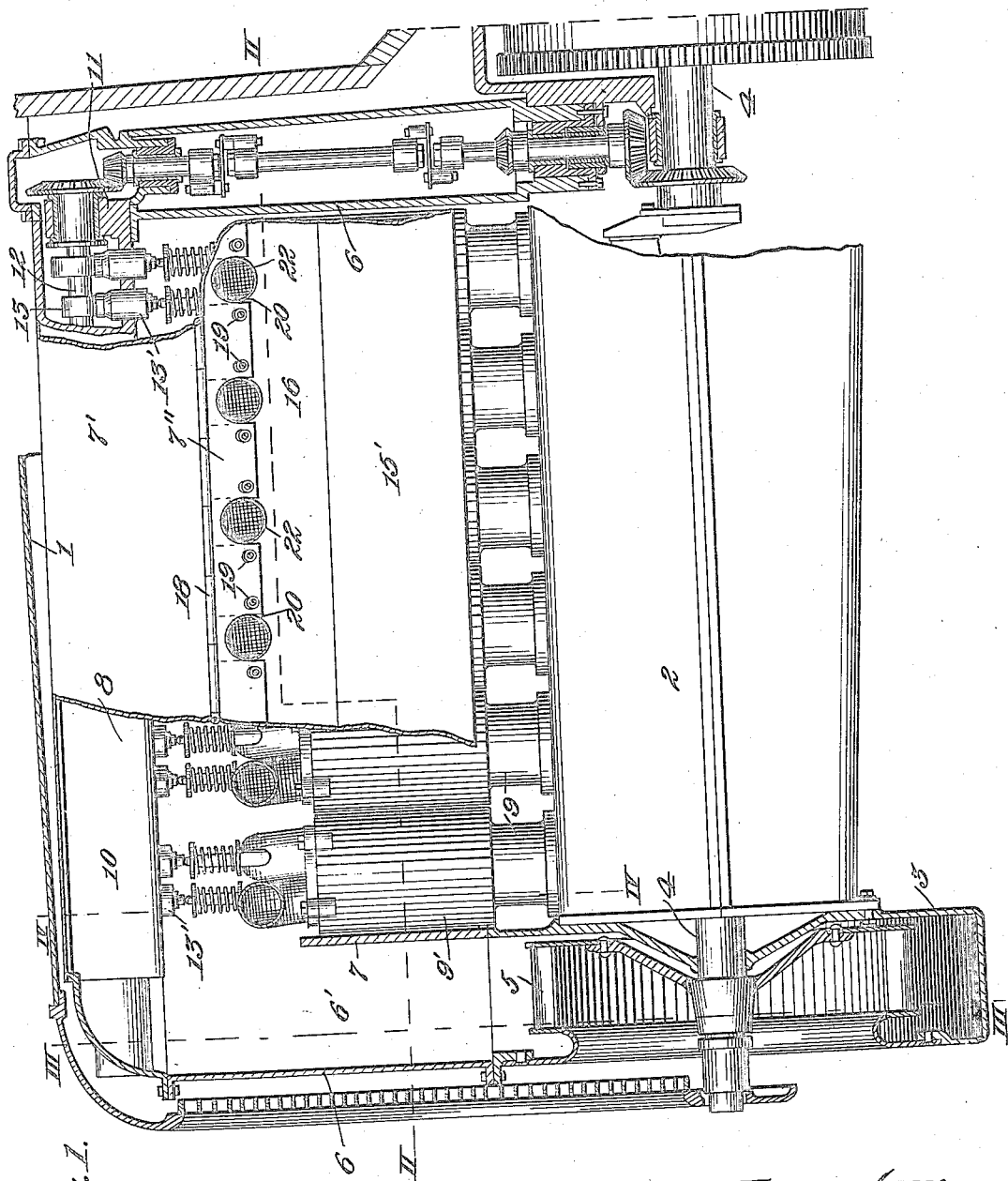
Figure 1 is a longitudinal sectional elevation of the means embodying my invention.

In the embodiment of my novel air cooling system for internal combustion engines utilized in connection with motor vehicles, I employ a hood 1 mounted in any suitable manner at the front end portion of the vehicle, and fixedly secured to the crank shaft casing 2 at the front thereof, is a scroll-shaped casing 3, which surrounds the crank shaft 4, and at the front end portion of said shaft is suitably mounted an air forcing fan 5, for the purpose hereinafter described. Upon the upper end of the casing 3 is fixedly mounted a longitudinal casing 6, said casing 6 being provided with an inner vertical extension 7, adapted to direct the air upwardly through the passage-way 6' between the partition and the front end of the casing 6. Mounted upon the upper end of the casing 6 is a longitudinal cast metal trough-shaped housing or carrying member 8, provided with a bearing 11 at each end thereof for the reception of a valve actuating cam shaft 12, provided with suitable cams 13 arranged at intervals throughout its length, adapted to contact with and properly actuate the engine tappet valves 13' as will be readily understood, said cam shaft being actuated by the crank shaft, through the medium of such means as is shown in Fig. 1, connecting the crank shaft with the cam shaft.

To the upper flanged surface 14 of the trough-shaped housing member 8, is fixedly secured a suitable cover plate 15, and to said cover plate is detachably secured the inner upper edges of the sheet metal dome-shaped member 7', forming a separable air sealed chamber 8', each lower edge 7" of said member 7' being detachably secured to a longitudinally arranged depending member 15' formed with downwardly and inwardly inclined or funnel-shaped upper side walls 16, and with depending concave side walls 17 which partially surround each of the engine cylinders and adapted to guide the air which is forced by the fan into the sealed air chamber 8' downwardly into contact with the outer surface of each engine cylinder 9 and its radiating fins 9' and out at the bottom thereof, thereby absorbing the heat from the engine cylinders and the heated parts of the engine and effectually keeping them in a properly cooled condition at all times.

It will be perceived that by detaching the inner upper edge of the dome-shaped member 7' at either side thereof, it may be swung open on its hinges at 18 so that access may be had to the valves and upper parts of the engine, and the concave depending portion of said member, while it partially surrounds each engine cylinder, it is open above the cylinders, and is fixedly secured by welding, brazing, or any other suitable manner to the inner side walls of the longitudinal depending member 15', as shown in Fig. 2.

It will be seen that the air forcing fan 5 is eccentrically mounted within and with relation to the scroll casing 3 at the front end portion of the crank shaft, said fan being so positioned with respect to said casing that a spiral or converging air space is formed between the peripheral portion of the fan and the casing adapted to equalize the rate of flow of air at all points around the circumference, by means of the progressive decrease in the capacity of the air space, thus allowing the fan to gather and constantly force a volume of air upwardly and into the air sealed chamber for distribution around, in contact with, and past each engine cylinder, the speed of the fan being commensurate with the speed of the engine, hence the greater the speed attained by the engine the greater the volume of air is forced into the separable air sealed chamber and in contact with and past the engine cylinders, thereby maintaining the cylinders and working parts of the engine at all times and under all conditions in a thoroughly cooled condition, as will be readily obvious to every one skilled in the art to which this invention pertains.

It will be understood that suitable devices are employed in connection with the hood, at the front portion thereof, for preventing the entrance of solid particles or foreign matter which may have a tendency to clog or injuriously affect the working parts of the engine.

By the employment of the novel means hereinbefore described, it will be clearly evident that as long as the engine is in operation a sufficient quantity of air is forced into the air sealed chamber and into contact with the radiating fins and walls of the engine cylinders and working parts of the engine to maintain said parts in a properly cooled condition, and as the speed of the engine is increased the volume of air forced through the air sealed chamber is also correspondingly increased, whereby said parts are effectively cooled at all times and under all conditions.

It will also be seen that the dome-shaped sheet metal member 7' is hinged to the upper edge portion of the member 7" and that said member 7" is detachably secured at its lower edge to the upper edge of the depending member 15', by suitable fastening means 19, the lower edge of the member 7" and the upper edge of the member 15' being oppositely recessed at 20 to form openings for the passage of the intake pipes 21 and exhaust pipes 22, respectively.

Having thus described my invention what I claim and desire to secure by Letters Patent is:—

1. An air cooling system for engines of motor vehicles, comprising a crank shaft and casing therefor, a scroll casing secured to the front end of the crank shaft casing, a casing mounted upon said scroll casing formed with an inner vertical extension extending above the engine cylinders, a separable air sealing member mounted on said casing, and a fan mounted on the front end of said crank shaft.

2. An air cooling system for engines of motor vehicles, comprising a crank shaft and casing therefor, a scroll casing mounted at the front end of the vehicle and fixedly secured to the shaft casing, a casing mounted upon said scroll casing formed with an inner vertical extension projecting above the engine cylinders, a dome-shaped separable air sealing member mounted upon said casing, and a fan mounted on the front end of said crank shaft.

3. An air cooling system for engines of motor vehicles, comprising a crank shaft and casing therefor, a scroll casing secured at the front end of the vehicle to said crank shaft casing, a casing mounted upon said scroll casing formed with an inner vertical extension projecting above the engine cylinders, a separable air sealing member mounted upon said casing forming an air chamber above all of the said cylinders, and a fan mounted on the front end of said crank shaft.

4. An air cooling system for engines of motor vehicles, comprising a crank shaft and casing therefor, a scroll casing fixedly secured to the shaft casing at the front end of the vehicle, a casing mounted upon said scroll casing formed with an inner upright extension projecting above the engine cylinders, a separable dome-shaped air sealing member mounted upon said casing and forming a longitudinal air chamber above all of the engine cylinders, and a fan mounted on the front end of said crank shaft.

5. An air cooling system for engines of motor vehicles, comprising a crank shaft and casing therefor, a scroll casing fixedly secured to the front end of the shaft casing, a casing mounted upon said scroll casing formed with an inner vertical extension projecting above the engine cylinders, a separable air sealing member mounted upon said casing formed with removable covers and a series of openings therethrough and adapted to form a longitudinal air chamber above all of the engine cylinders, and a fan mounted on the front end of said crank shaft within the scroll casing.

6. An air cooling system of the character described for motor vehicles comprising a crank shaft and casing therefor, a scroll casing mounted at the front end portion of the vehicle to the shaft casing, a casing fixedly mounted thereon, a separable air sealing member mounted on said casing forming a longitudinal air chamber above all of the cylinders, removable hinged covers forming a part of said member, depending members secured to said covers and provided with means partially surrounding all of the cylinders and a fan mounted on the crank shaft eccentrically disposed within the scroll casing for forcing air through said chamber and simultaneously into contact with each engine cylinder and below said depending members.

7. An air cooling system of the character described for motor vehicles comprising a crank shaft and casing therefor, a scroll casing mounted at the front end portion of the vehicle to the shaft casing, a casing mounted thereon formed with an inner vertical extension adapted to form an air passage-way extending above the engine cylinders, a separable air sealing member mounted on the last named casing forming a longitudinal air chamber, a trough-shaped cam shaft housing mounted within said chamber, a cover for said housing, hinged removable doors forming a part of said member and secured to said cover, and a fan mounted on the front end of the crank shaft and eccentrically disposed within the scroll casing for forcing air through said air chamber.

8. An air cooling system of the character described for motor vehicles comprising a crank shaft and casing therefor, a scroll casing fixedly mounted at the front end portion of the vehicle to the shaft casing, a casing mounted thereon formed with an inner vertical extension, a separable air sealing member mounted on the last named casing formed with hinged removable covers and forming a longitudinal air chamber, downwardly and inwardly inclined depending members formed with a series of openings therethrough and concave portions partially surrounding each engine cylinder detachably secured to said sealing member, and a fan mounted on the front end of the crank shaft within the scroll casing for forcing air through said air chamber and below the depending members.

9. An air cooling system of the character described for motor vehicles comprising a crank shaft and casing therefor, a scroll casing fixedly mounted at the front end portion of the vehicle to the shaft casing, a casing mounted thereon formed with an inner vertical extension, a separable air sealing member mounted on the last named casing forming a longitudinal air chamber and provided with removable covers and detachable depending members, a trough shaped cam shaft housing mounted upon the casing within said chamber, and a fan eccentrically mounted on the front end of the crank shaft and eccentrically disposed within the scroll casing for forcing air through said air chamber and below the depending members.

10. An air cooling system of the character described for motor vehicles comprising a crank shaft and casing therefor, a scroll casing fixedly secured to the crank case at the front thereof, a casing mounted thereon formed with an inner vertical extension terminating above the engine cylinders, a separable air sealing member secured to the last named casing forming a longitudinal air chamber above all of the engine cylinders, a longitudinal trough-shaped housing mounted within said chamber, hinged removable covers secured to said housing, detachable depending members provided with concave portions partially surrounding each engine cylinder and secured to said member, and a fan mounted on the front end of the crank shaft eccentrically disposed within the scroll casing for forcing air through said chamber into contact with all of the engine cylinders and out below the said depending members.

ANSLEY H. FOX.